United States Patent [19]
Doolittle

[11] 3,856,236
[45] Dec. 24, 1974

[54] COMPOSITE AIRCRAFT
[75] Inventor: Donald B. Doolittle, Hockessin, Del.
[73] Assignee: All American Industries, Inc., Wilmington, Del.
[22] Filed: May 7, 1973
[21] Appl. No.: 357,636

[52] U.S. Cl. .................................... 244/2, 244/26
[51] Int. Cl. ............................................. B64c 37/02
[58] Field of Search ............ 244/2, 5, 17.11, 25, 26, 244/27, 28

[56] References Cited
UNITED STATES PATENTS
1,838,248    12/1931    Bourland .............................. 244/26
FOREIGN PATENTS OR APPLICATIONS
191,445    1/1923    Great Britain ....................... 244/26

*Primary Examiner*—Trygve M. Blix
*Assistant Examiner*—Jesus D. Sotelo
*Attorney, Agent, or Firm*—Connolly and Hutz

[57] ABSTRACT

A balanced set of wings extend horizontally from a large lifting balloon chamber containing a lighter-than-air gas, such as helium. The gas is stored within eight preformed balloonettes disposed within corresponding segments of the spherical balloonette-containing chamber of sheet material distended into substantially spherical form by a slight positive air pressure. The wings are mounted on horizontal spars connected to the center of a vertical mast installed within the balloon chamber. The spars are secured against upward and downward forces by guy wires, from the mast, between which the balloonettes are disposed. External guy wires also support the wings. Rotatable couplings connect the wings to the spars to permit adjustment of their angle of attack. Turboprop engines are mounted on the wings to rotate the wings and attached chamber about its vertical axis at a relatively slow rotational, appreciable tangential speed. A control individually or collectively varies the effective angle of attack of the wings to either provide a strong dynamic lifting force for augmenting the static force of the balloons to lift large weights or to provide a strong negative dynamic lift for overcoming the static lift and manuevering the aircraft towards the ground. The control can also cyclically vary the angle of attack to tilt the top of the aircraft in a particular direction whereby the aircraft is caused to move in that direction. The control is derived from a cab hanging on a swivel joint below the mast which is stabilized to prevent it from rotating with the aircraft. This cab may be adapted from a helicopter fuselage less the rotors. Appreciable tangential speed of the wings which slowly rotate in a large diameter circle provides a strong dynamic force which is capable of lifting extremely heavy weights, such as 100,000 lbs. In conjunction with a static balloon lift component of about 40,000 or 50,000 lbs. The excess of dynamic over static lift permits the highly buoyant aircraft to be maneuvered towards the ground without requiring any ballast.

15 Claims, 3 Drawing Figures

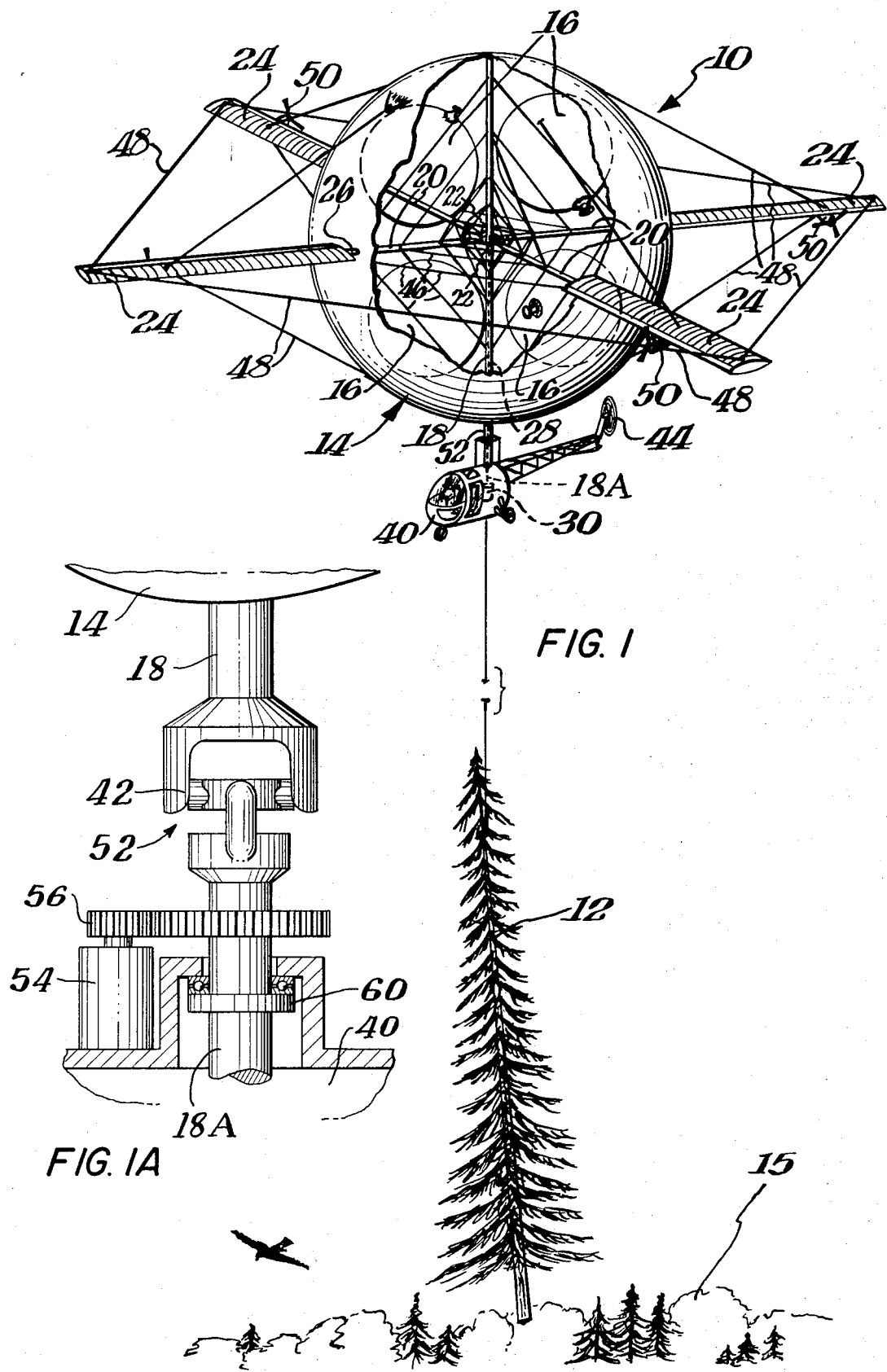

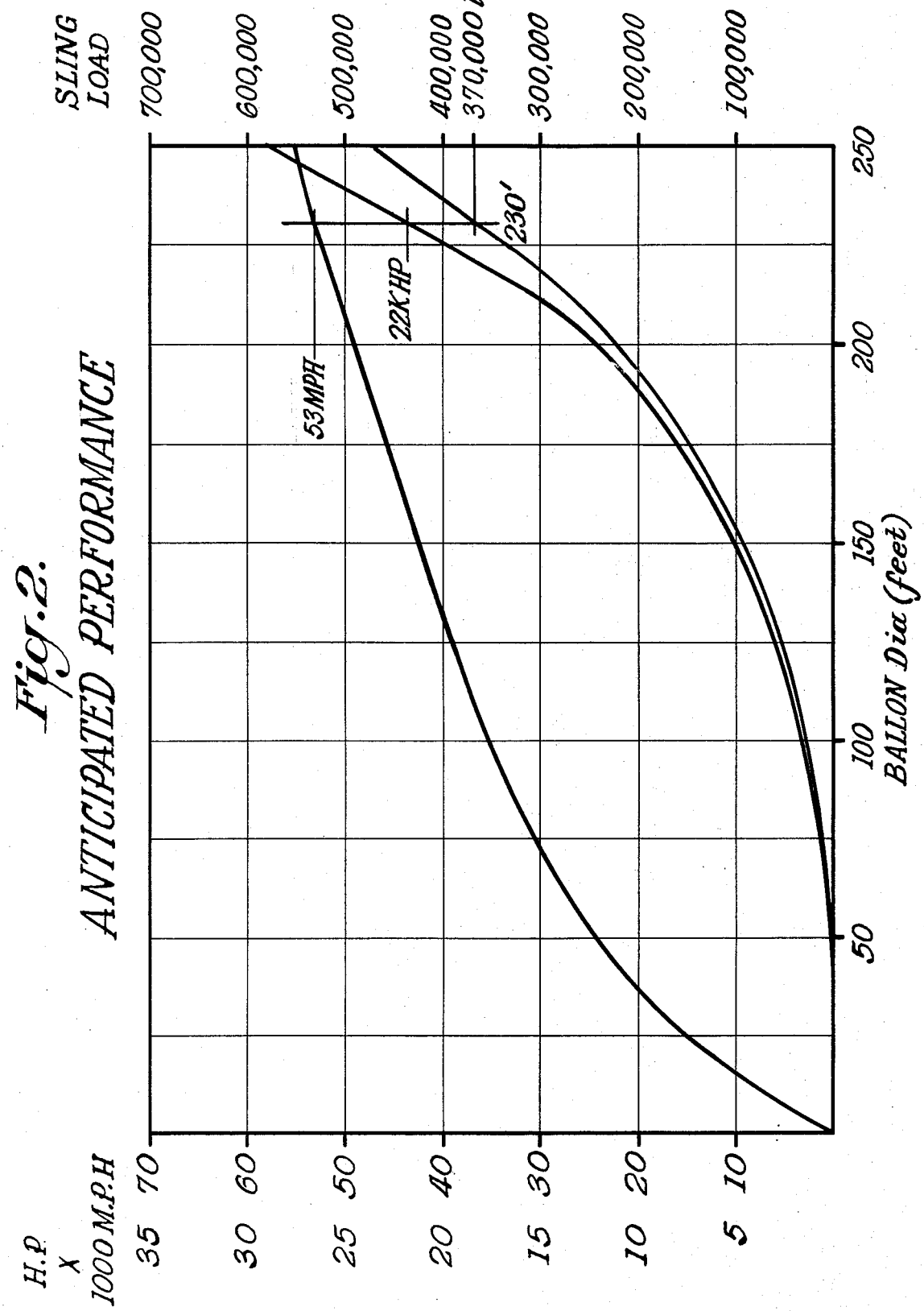
Fig.2. ANTICIPATED PERFORMANCE

COMPOSITE AIRCRAFT

BACKGROUND OF THE INVENTION

There are a number of uses for an aircraft capable of lifting and transporting for limited distance at relatively slow speed extremely heavy weights, such as 100,000 lbs. Such uses include carrying trees directly out of forests without building any roads. Attempts have been made to utilize balloons, for lifting heavy loads such as large logs from a forest, but they are difficult to maneuver and require troublesome ballast when detached from the working load. Helicopters have also been tested for transporting logs from a forest but their load-carrying capacity is relatively limited and operating costs are high. An object of this invention is to provide an aircraft capable of lifting and transporting extremely heavy loads. Another object is to provide such an aircraft which is relatively economical to build and operate.

SUMMARY

A composite aircraft capable of carrying extremely heavy loads includes a large balloon chamber containing a lighter-than-air gas which provides a strong static lifting force. A set of substantially horizontal wings are mounted on spars extending from a mast on the vertical axis of the chamber through rotatable couplings which permit adjustment of their effective angle of attack. Thrust motors are mounted on the wings to rotate them about the vertical axis within the chamber. A control is connected to the wings for individually varying their effective angle of attack to either provide a strong dynamic lifting force for augmenting the static lifting force to lift extremely heavy weights or to provide a strong negative dynamic lift for overcoming the static lift and maneuvering the aircraft towards the ground. The dynamic lifting force is slightly greater than the static to insure that the static lifting force can be overcome without requiring ballast and for traversing the aircraft laterally over the ground. Lateral translation is accomplished by tilting the aircraft and plane of the rotating wings in the desired direction of movement by a cyclical lift control similar to the cyclical pitch control utilized in a helicopter. The control may be contained within a console slung on a swivel below the balloon chamber which is stabilized to prevent it from being rotated with the balloon chamber. The balloon chamber amy include a single large balloon or a number of balloonettes contained within segments of a substantially spherical bag distended by slight positive air pressure. The wings and spars may be supported by guy wires from a vertical mast within the chamber against both upward and downward forces.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is pictorial view partially broken away of one embodiment of this invention lifting an entire tree from a forest;

FIG. 1A is an enlarged view in elevation of the suspension between balloon chamber and cab of the embodiment shown in FIG. 1;

FIG. 2 is a theoretical diagram of lateral speed and load capacities of the embodiment shown in FIG. 1.

DESCRIPTION OF THE PREFERRED EMBODIMENT

In FIG. 1, is shown a composite aircraft 10, lifting and transporting an extremely heavy tree 12, directly from forest 15. The ability of aircraft 10 to lift and transport a complete untrimmed tree, branches and all, makes it possible to selectively pluck large trees from the midst of a forest without cutting erosion promoting roads and swaths through the forests.

Aircraft 10 includes a large balloon chamber 14 containing within balloonettes 16 a lighter-than- air gas such as helium. Chamber 14 is distended in substantially spherical shape by a slight air pressure provided by a blower or compressor (not shown). Chamber 14 can also be comprised of a single teardrop shaped balloon configuration, but the spherical form reduces drag and facilitates maneuvering. The outer skin of spherical chamber 14 is for example made of a relatively strong fabric, such as nylon. Balloonettes 16 are for example made of an elastomer coated Dacron or of Mylar film. Dacron is the trademark of E. I. du Pont de Nemours & Co. of Wilmington, Delaware for a synthetic fiber made by the combination of demethyl terephthalate and ethylene glycol. Mylar is the trademark of the aforementioned company for a highly durable, transparent water repellent fiber of polyethylene terephthalate resin. Balloonettes 16 are inflated to slightly less than full spherical volume, such as 90 percent thereof, to allow for temperature and pressure fluctuation.

A strong mast 18 of structural material such as steel or duralumin is mounted within chamber 14 at its vertical axis. Wing spars 20 are joined by connectors 22 to the middle of mast 18 for supporting the four wings 24 which extend substantially horizontally about chamber 14. Rotatable couplings 26 connect wings 24 to spars 20 to permit their angle of attack to be adjusted for individually varying their lift. Control of the angle of attack is provided by a linkage diagrammatically illustrated by broken lines 28 within the interiors of mast 18 and spars 20. This control is actuated by a helicopter-type cyclical control diagramatically illustrated by block 30 in control console 40, which is hung by a swivel bearing 42 below the bottom of mast 18 extending below chamber 14. Swivel bearing 42 may also be described as a rotatable or universal joint 42. The cyclical control is, for example, as described in *Aerodynamics of the Helicopter* by Alfred Gessow and Garry C. Myers, Jr. published by the Frederick Ungar Publishing Co. New York, New York., U.S.A., Copyright 1952 and republished 1967, pages 22–28, or *Helicopter Engineering* by Raymond A. Young, published by The Ronald Press Company, New york, Copyright 1949, pages 8–13.

Control console 40 is for example the cabin and gyroscopic stabilizer 44 of a helicopter, less the propulsion engines and rotor blades. Wings 24 are supported against upward and downward reaction forces by a series of guy wires 46 connecting spars 20 to mast 18 within balloon chamber 14. The external wings 24 are also supported by guy wires 48 extending outside of balloon chamber 14. The relatively slow linear speed of wings 24 minimizes the drag caused by outer guy wires 48 and makes it insignificant.

Thrust motors 50, such as turboprop engines, are mounted on wings 24 for rotating them about mast 18 and the vertical axis of rotation of aircraft 10. Turboprop engines are advantageous for this service because of their smooth dependable and reliable operating characteristics with relatively good fuel economy and efficient aerodynamic performance.

Aircraft 10 (without a sling load) is at all times buoyant and landing involves mooring. As the size increases, the maximum wind in which the vehicle can be moored simply by a single point at the bottom of the control cab or by its lifting sling increases. All vehicles large enough to be of economic value (i.e., over 20,000 lbs. sling load) can be moored in this fashion in all normal wind conditions (i.e., up to 20–40 mph depending on size). For conditions beyond the single point mooring capability, facilities must be prepared for by more complicated mooring systems. Unlike an airship which requires swinging room the spherical aircraft is non-directional, but is also, consequently, of higher drag. It appears, however, that it should be in general much easier to handle and moor because of it non-directional characteristics.

Ferrying over long distances does not appear practical and it would probably be better in small sizes to knock down and ship. A trip of a few hundred miles could be made with proper attention to weather. The problem is not endurance of the vehicle but endurance of the crew since it would be possible to sling carry fuel for many hours (possibly days) flight. In all uses there will be wind conditions where flight operations should be discontinued. How restrictive these limitations will be should be studied in detail for each proposed use.

One limitation of aircraft 10 may be its inability to operate when the load is exactly equal to the aerostatic lift. Under this condition the vehicle is neutrally buoyant and there is no aerodynamic thrust available to be vectored for translation unless the thrust vector is made parallel to the earth. Making the balloon-rotor rotate 90° does not seem practical for most operations. Uses which involve a loaded trip in one direction and an empty trip back, or fully loaded in both directions are more suitable to the flight characteristics of the aircraft 10. Some thought has been given to the possibility of vertical tacking if forced to operate with load equal to aerostatic lift. In this mode the vehicle would climb (i.e., at 45°) and the drag would provide force for the rotor to work against. Then when halfway to destination, a corresponding descent would be undertaken. Difficulty would still be encountered in holding a hovering station in a wind. This condition would, therefore, probably be amended by adjustment of static lifting force.

Because of the required size of the central balloon dictated by the static lift required, forward speed of the aircraft will be quite limited as compared with the conventional helicopter. This fact limits this vehicle to missions where efficient static lifting ability is of prime importance and translation velocity is secondary. However, since ability to operate under reasonable wind conditions must be considered, speeds of 30 to 50 mph are considered as essential to achieve an economically useful heavy lifter. Since the balloon chambers will be the major source of aerodynamic drag, the $C_D$ of this structure is the major factor in achieving acceptable translational flight performance.

Practically no hard data is available on the drag of spheres at the Reynolds numbers involved in this application. Hoerner's "Fluid Dynamic Drag" indicates a $C_D$ of about 0.15 in the $10^7$ Reynolds number range. The spin of the sphere will cause alteration of the flow pattern and may increase the $C_R$ of the sphere. Application of some form of boundary layer control such as blowing aft in the advancing hemisphere shows possibilities of negating this effect and even reducing the overall $C_D$ below that of a static sphere with reasonable expenditure of power and complication of the structure.

Equations for quick estimate of operating performance are presented in the following. These equations are based on the following assumptions:
1. $C_D$ (coefficient of drag) of the sphere is 0.2.
2. Total drag is 1.2 X sphere drag.
3. Wing lift is 1.2 time net aerostatic lift.
4. Structural weight of wings and balloon is equal to wing lift divided by the cosine of the maximum thrust vector tilt angle.
5. The thrust vector is perpendicular to the tip plane of the wings or effective rotor.

The following are computations based upon a 21,600 lb. payload equivalent to that carried by the strongest lifting helicopter now available. The gas envelope is roughly spherical in shape, 90' in diameter, with four blades or wings mounted thereon. Each wing is 57' long by 12' wide. Four Allison turboprop engines, model 250-B17 (military designation T63A5A) are used, on each wing. These engines are rated at 260 h.p. continuous cruise with a maximum power of 417 h.p. available. The dry weight specification is 187 lb. each, so the gross weight of all engines and propellers should not exceed 1,400 lbs. The Control Cab could be adopted from a Bell helicopter model Oh-58A. Using the operating weight of this unit (2,313 lbs.) less engine and blades with drive train, the Control Cab should not exceed 900 lbs. Based upon the use of state of the art balloon construction and rough approximations of structure requirements, gross weight of these items should be in the neighborhood of 6,500 lbs.

To summarize the weights of the major components:

Wings

| | |
|---|---|
| 4 each, 57' X 12' totaling 2,736 sq. ft. Assuming construction weight of 1.5 lbs./sq. ft. (at less than 5 lbs./sq. ft. wing loading) Gross weight would be | 4,100 lbs. |
| Engines | |
| 4 each Allison Model 250-B17 Estimated gross weight with propellers | 1,400 lbs. |
| Control Cab | |
| Bell OH-58A less blades, drive train and engine | 900 lbs. |
| Balloon | |
| Envelope and structure | 6,500 lbs. |
| Gross Weight, approx. | 12,900 lbs. |

The approximate aerostatic lift of the 90' diameter balloon would be:

Volume: $(4/3)(3.14)(45)^3 = 381,631$ cubic feet

Lift: Assuming 90% of available volume occupied by helium:
$381,631 \times .9 \times .0649 - 22,291$ gross aerostatic lift The approximate hover power requirements can be derived as follows:

Area of Rotor = overall area of disc minus area of balloon = 27,600 sq. ft.

| | |
|---|---|
| Structure weight (est.) | 12,900 lbs. |
| Payload | 21,600 lbs. |
| | 34,500 lbs. |
| Less Aerostatic lift | 22,300 lbs. |
| Net aerodynamic lift. req. | 12,200 lbs. |
| Disc loading (w) | = 12,200/27,600 = .442 lbs./sq. ft. |
| Power loading | = 38 × .6*/2 $\sqrt{.442}$ = 34.23 |
| Horsepower req. to hover with 21,600 lb. payload | = 12,200/34.23 = 356.41 h.p |

*(estimated rotor figure of merit)

Using the above assumptions, this vehicle can hover and support a 21,600 lbs. sling load out of ground effect using 356 h.p.

The most problematical factor is the translational speeds possible in this configuration. Literature examination fails to disclose data that is directly applicable to this design. Data that is available indicates that a coefficient of drag ($C_D$) of 0.2 is not unreasonable without any attempt at boundary layer control (BLC). Preliminary consideration of various BLC methods provides a basis for a projected $C_D$ of 0.05 if an additional 300 h.p. can be provided for this purpose. Determination of the actual conditions must await model tests, preferably in a suitable wind tunnel. For the purpose of first estimates, a $C_D$ of 0.2 has been assumed. On this basis total drag may be computed as follows:

DRAG = $C_D$ × 0.002378/2 × Frontal Area × (Velocity)$^2$

If a forward speed of 40 m.p.h. (58.66 ft. per sec.) and a $C_D$ of 0.2 are assumed, DRAG = 5,250 lbs.

HP = 58.66 ft. per sec. × 5,250 lbs./550 = 307,965/550

= 560 HP required for a forward speed of 40 m.p.h.

On the basis of the foregoing computations, a total requirement of (support horsepower in hover, 356 plus translational horsepower of 560) 916 HP can be projected. The suggested engines develop a maximum of 1,660 HP, so the basic design would appear to be conservative as to the Power/Performance curve.

It is noteworthy that the actual horsepower requirements of existing helicopters (S-64) exceed 9,000 HP for movement of an identical payload, and actual translation speeds under full load often do not exceed 40 m.p.h. In contrast to helicopter theory, the concept disclosed gets better as it gets bigger. The vehicle required to lift and transport 500,000 lbs. shows very favorable ratios, and is well within present state of the art construction techniques. See FIG. 2 on this regard.

A larger aircraft having a normal payload of 29,000 lbs. and an overload capacity of 40,000 lbs. has a balloon diameter of 100 ft. and four wings measuring 75 ft. by 10 ft. each. Each wing mounts an Allison Model 200 B17 turboprop engine having a normal cruise horsepower of about 1,200 HP and a maximum of 1,520 H.P.

Using this value (0.2) for $C_D$ and a forward speed of 35 MPH (51.33 A/Sec):

Drag = $C_D$ × 0.002378/2 × Frontal Area × (velocity)$^2$

= 4918 lbs.
  6000 estimated total drag including load

= 6000 lbs. × 51.33/550 × 0.75 (Propulsion efficiency)

= 747 HP

The coefficient of lift ($C_L$) for this vehicle would be 0.127

Induced drag HP = $C_L$/4 × 16,540 (Rotor Lift × Velocity 51.33)/550 × 0.75 = 62 HP Assuming the profile Drag/Lift ratio is 0.12:

Profile Drag HP = 0.12 × 15,650 × 51.33/550 × 0.75 = 234 HP

Total translational horsepower requirements:
35 MPH Vehicle with 29,000 lbs. payload

| | |
|---|---|
| Basic translational HP | = 747 |
| Induced drag power req. | = 68 |
| Profile drag power req. | = 256 |
| | 1071 HP |

As the selected engines have a continuous rating of 1,520 HP, this provides a reasonably conservative design.

The wings are more closely related to light aircraft wings than to conventional helicopter blades. A D-tube leading edge with rib and fabric trailing edge is proposed with a drag box at the joint with the balloon interior structure. The wing is hinged to rotate about a point well ahead of its aerodynamic center. External wire bracing reduces structural weight since at the slow tip speeds involved the aerodynamic penalty is insignificant.

Structure inside the balloon serves to transmit the lift and drag forces of the blades, the aerostatic forces of the lifting gas, and the sling load forces. Since it is not exposed to moving air, maximum use of dispersed structure can be made to reduce weight. The structure at the root of each wing must be capable of holding the chordwise torque forces caused by chordwise components of lift and drag, the compressive thrust of the wing caused by the component forces of the supporting brace wires, the torque of the wing lift control and the vertical and horizontal wing root forces. The space between the balloon equator and the longitudinal plane of each wing must be kept clear for the gas containing balloonettes. The exterior skin of the balloon is an elastomer coated Dacron arranged in separate sections bounded by the equator and longitude planes of the blades. Thus a four wing system has eight balloonettes and eight separate sections of the exterior sphere. A sealing zipper would provide easy removability to the exterior panels. Lifting forces of the northern (upper) hemisphere will be supported at the equator by beam or catenary structure between the wings. The lift of the southern (lower) hemisphere will be born by catenary structure at the plane of the equator.

The control cab and load sling are attached at the south pole by a suspension 52 including a self-aligning bearing which will allow the cab to stay stationary under the influence of a tail rotor stabilizer 44 as the balloon and blades rotate, and allow the sling tension member to remain vertical as the balloon and blades tilt to achieve translation. A spherical roller bearing may be used here if it has sufficient angular tolerance i.e., 20 to 30 percent. A suspension 52 including motor 54 and spurgear 56 mounted fixed in torque on the control cab 40 and a ring gear 56 on the balloon chamber 14 through universal joint 42 would allow the operator to retain the fixed cab heading without using a tail rotor 44 as the balloon rotates above. Motor 54 drives spurgear 56 and cab 40 about ring gear 58 through rotating bearing 60 which angularly isolates balloon chamber mast 18 from helicopter support mast 18A.

Slip rings, and possibly rotatable couplings for air and/or hydraulics will be required to transmit control signals from cab to balloon-rotor. Reliability and redundancy in the detail design of this feature will be extremely important.

Fuel will be carried in the lower part of cab to obtain as much statically stable moment as possible during unloaded flight.

Excessive static stability during loaded flight caused by the sling load — buoyant force couple may be a control problem but preliminary calculations show it to be solvable by cyclic pitch control fore and aft with the sling attached at the south pole. If the performance penalty for this control proves too great, the structural penalty of moving the sling and cab self-aligning joint toward the center of the sphere can be investigated.

The sling itself is a relatively simple tension member with hooks, releases, grabbers, etc., dictated by the use of the vehicle and will not be treated in detail herein.

The outer skin of the balloon is pressurized with an air blower to maintain a small pressure differential to maintain the shape of the sphere against any expected dynamic pressure. The balloonettes are inflated to less than full spherical volume (assumed 0.9 in performance calculations) to allow for variation due to temperature and altitude.

Aircraft 10 offers several interesting safety features compared to a conventional helicopter. Since the entire structure is buoyant with the "hold down" load being the sling cargo or in the absence of cargo the negative lift of the rotor, loss of power results in falling up. When loaded, aircraft 10 has such a light disc loading that autorotative descent is at parachute values, allowing a machine fully loaded to land its cargo and remain attached to it, as an anchor. However, since aircraft 10 is multi-engined and since the full load hover power is less than half of that needed to assure a reasonable cruising speed, there is little chance of the requirement for a power off descent or danger of uncontrolled ascent. Features for gas valving could be incorporated but are not considered essential for a multi-engined machine and might upon analysis be of more hazard than good. Because of size, direct control for both collective cyclic pitch does not seem to be practical, therefore care in design and sufficient redundancy in the power pitch controls must be incorporated. The lifting gas in separate balloonettes (eight for a four wing system) gives good redundant safety in this area. The excellent apparent protection against this machine falling should be of special interest in operation in forest areas where fire is a great hazard and in populated areas.

On the negative side, the limited speed of aircraft 10 makes operation in high winds a problem and possibly hazardous. Droppping of sling cargo as a safety measure in remote areas should be considered, but with all other redundancies of the vehicle, there is little probability this will be required.

Operation of engines under moderate G's does not appear to be a serious problem. Both turboprop and reciprocating engines should not have any major problem at 10 g or under. Centrifugal acceleration can be kept as low as 5g if required without compromising the performance seriously. In the final analysis, a qualification run on a centrifuge arm can be made to proof test the engine selected under actual G conditions.

The propeller should be of a constant speed variable pitch type and should be capable of responding to the cyclic variation in airspeed. Size will be larger than normal for aircraft because of low blade speed. Stresses on propeller, gear box and turbine rotor due to gyroscopic moments will have to be considered. Effect of cross winds due to horizontal speed must also be considered in propeller design if a serious problem should develop. The engine and prop could be mounted with a vertical and horizontal tail to hold the thrust line directly into the relative wind.

Due to location of the center of buoyancy above the center of gravity, aircraft 10 will with collective lift control only be capable of vertical ascent and descent and is statically stable in this mode. The static stability will vary widely depending on the sling load since this load is conveniently slung from the south pole of the sphere even without a sling load. However, the weight of the control cab, sling and fuel will keep the vehicle statically stable. Assuming for a 30,000 lbs. sling load vehicle, the control cab sling and fuel weigh 5,000 lbs., the unloaded static stability is 14 percent of the loaded stability.

In order to achieve other than vertical flight, a cyclic lift control as previously discussed must be utilized to overcome the static stability and cause the balloon and wing to tilt in the direction of desired horizontal motion. As the aircraft translates, differences in the lift distribution on the advancing and retreating wings will in spite of equalized lift cause unequal moment about the balloon center with resultant lateral tilt. This must be compensated for by some lateral as well as fore and aft cyclic lift control.

A standard helicopter type control stick controlling the tilt of the balloon rotor by cyclic lift control is provided along with a normal collective lift lever. Engine power is automatically adjusted by centrifugal force to maintain a constant (or if desired, adjustable) rotor angular velocity.

In order to provide the lift control moments to angularly adjust the wings, an air system is utilized with compressor bleed from the engines if available or separate low pressure pumps on each engine if not. Flow from each engine is piped to a central manifold and from there to the control cab through a rotating valve system at the cab-balloon rotating joint. This may be either full flow or a servo flow depending on size of the vehicle and control power requirements. Direct operation is desired for reliability. Electrical operation of servo valves could also be used with slip rings replacing the rotary valve system at the rotating joint.

The cyclic lift control will be connected to a fore and aft and an athwartship control valve. The fore and aft valve is operated by sidewise movement of the cyclic lift control and controls lift in the right and left semicircles of the rotor wings.

For an aircraft 10 capable of transporting a 100,000 lb. payload, three blades would be used on a balloon approximately 150 ft. in diameter. Each blade (actually a symmetrical aircraft wing of completely standard construction) is approximately 125 ft. long by 18 ft. wide and mounts a turboprop engine.

Rotational speed of aircraft 10 in this 100,000 lb. payload configuration is about 10 RPM. This will produce a maximum g load of 6.2 at the tip of the wing, with considerable lower and fully acceptable G forces experienced by the engines. Forward speed will be in the neighborhood of 35 to 40 MPH using a maximum of 5,000 horsepower without the use of boundary layer control (BLC) on the sphere.

I claim:

1. A composite aircraft comprising a large balloon chamber containing a lighter-than-air gas which provides a large static lifting force having a magnitude substantially greater than the weight of said aircraft, said aircraft having a substantially vertical axis, a set of substantially horizontally disposed wings extending radially relative to said vertical axis, a structural assembly connected to said aircraft at said vertical axis for supporting said wings in a substantially horizontal radial array relative to said aircraft, rotatable coupling means connecting said wings to said structural assembly and permitting adjustment of the effective angle of attack of said wings, thrust means mounted upon said wings whereby said wings and chamber are rotated about said axis, and control means connected to said wings for varying their effective angle of attack to either provide a dynamic lifting force for augmenting said static lifting force whereby said combined static and dynamic lifting forces are sufficient to lift large weights or to provide a strong negative dynamic lift for overcoming said static lift and moving said aircraft towards the ground.

2. An aircraft as set forth in claim 1 wherein a control cab is disposed below said balloon chamber, a rotatable joint connecting said control cab to said balloon chamber, and a stabilizing device being connected to said control cab for preventing it from rotating with said balloon chamber.

3. An aircraft as set forth in claim 2 wherein said rotatable joint comprises a universal joint.

4. An aircraft as set forth in claim 2 wherein said stabilizing device comprises a vertically disposed gyroscopic element.

5. An aircraft as set forth in claim 2 wherein said rotatable joint includes a variable speed motor and a geared transmission for maintaining said cab in a predetermined orientation.

6. An aircraft as set forth in claim 1 wherein said structural assembly comprises a substantially horizontal radial array of spars.

7. An aircraft as set forth in claim 6 wherein a vertically disposed mast is mounted within said balloon chamber, and said spars being connected to said mast.

8. An aircraft as set forth in claim 7 wherein guy wires connects said spars and said wings to said mast for supporting them against upwardly and downwardly reacting forces.

9. An aircraft as set forth in claim 1 wherein said control includes a cyclic control for individually varying the effective angle of attack of said wings for tilting said aircraft and wings to obtain lateral translation over the ground.

10. An aircraft as set forth in claim 9 wherein said cyclic control is similar to a helicopter cyclic pitch control.

11. An aircraft as set forth in claim 1 wherein said thrust means comprise airplane engines mounted on said wings.

12. An aircraft as set forth in claim 1 wherein said balloon chamber comprises a substantially spherical envelope and said lighter-than-air gas is stored in balloonettes disposed within said spherical chamber.

13. An aircraft as set forth in claim 12 wherein said spherical chamber is distended in a substantially spherical form by a slightly positive air pressure within it.

14. An aircraft as set forth in claim 13 wherein a vertical mast is mounted within said balloon chamber, said wing supporting structural assembly being connected to said mast, guy wires between said mast and said structural assembly for supporting it and also dividing said chamber into segments, and said balloonettes being disposed within said segments.

15. An aircraft as set forth in claim 1 wherein a hoisting sling is mounted below said balloon chamber.

* * * * *